Jan. 9, 1968  V. P. TUCKER  3,362,809
APPARATUS FOR GRANULATING FERTILIZER
Filed Feb. 3, 1965  2 Sheets-Sheet 1

INVENTOR.
VALLEN P. TUCKER
BY
William A. Mikesell Jr.
ATTORNEY

Jan. 9, 1968 V. P. TUCKER 3,362,809
APPARATUS FOR GRANULATING FERTILIZER
Filed Feb. 3, 1965
2 Sheets-Sheet 2

INVENTOR.
VALLEN P. TUCKER
BY
William A. Mikesell Jr.
ATTORNEY

United States Patent Office 3,362,809
Patented Jan. 9, 1968

3,362,809
APPARATUS FOR GRANULATING FERTILIZER
Vallen P. Tucker, Madison, N.J., assignor to Continental Oil Company, Ponca City, Okla., a corporation of Delaware
Filed Feb. 3, 1965, Ser. No. 430,133
2 Claims. (Cl. 71—43)

ABSTRACT OF THE DISCLOSURE

Apparatus for continuously producing granular fertilizer comprising an elongated reactor adapted to be submerged in a rolling bed of fertilizer granules, the reactor comprising means to react at least two fluids in a converging path, with the reaction products emerging from the reactor into the bed without substantial change in direction.

---

Figure 1:
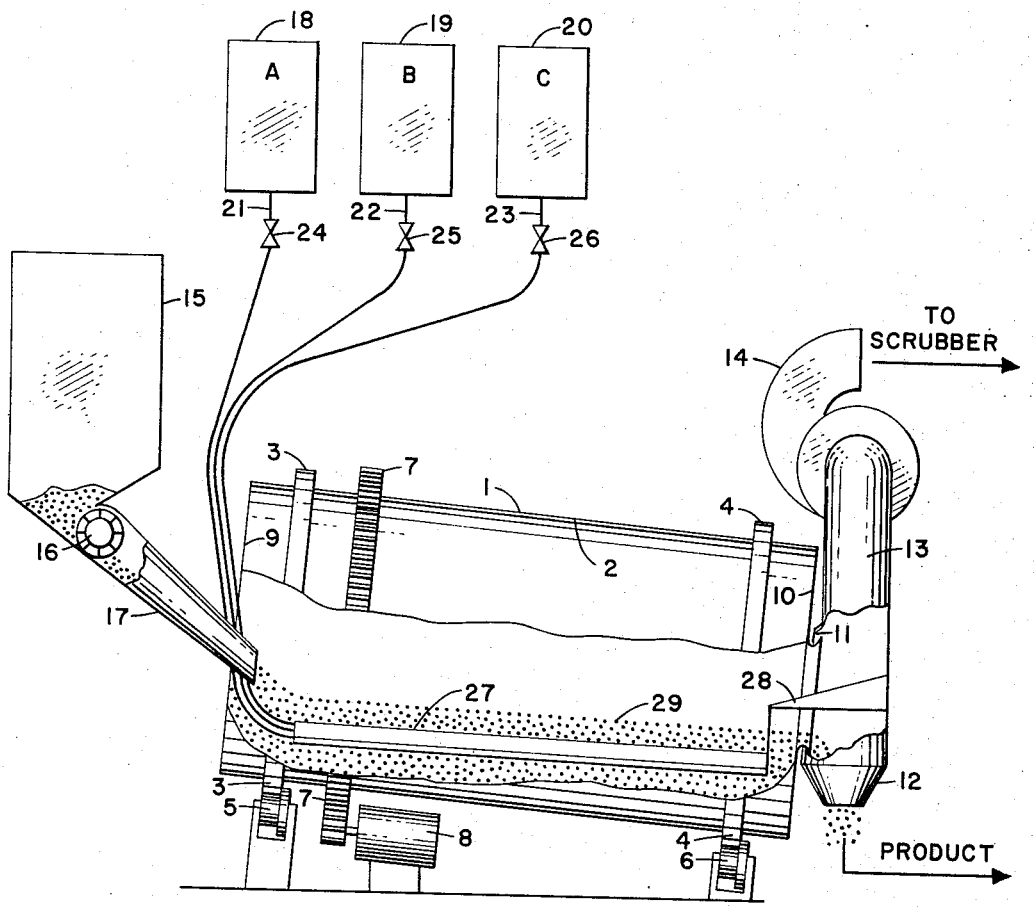

This invention relates to method and apparatus for producing granular fertilizer. In one aspect, the invention relates to method and apparatus adapted to produce a granular solid fertilizer in a single step directly from fluid and liquid raw materials. In another aspect, the invention relates to method and apparatus for producing solid fertilizer from fluid feed materials in a continuous manner and with low recycle of product solids.

Fertilizer solids have long been produced from various admixtures of solid, liquid and gaseous feedstocks. It is common practice in the fertilizer industry to locate relatively small batching or blending plants at various strategic market locations, so that a wide variety of fertilizer grades can be produced on location, and without the necessity of carrying a widely diverse inventory, from relatively few raw materials. In addition to batching processes, fertilizers are also commonly made on a continuous basis in apparatus known as continuous ammoniators. When gaseous or liquid feeds are used in these devices, it is common practice to first mix such gaseous and/or liquid components in a pre-reactor or pre-neutralizer, wherein the materials are thoroughly mixed and kept in solution by addition of water. The resulting slurry or solution is then fed to the granulating drum, where it is added to solid raw materials and, with recycle of solid product, formed into granules. Not only does this commonly-used pre-reactor system add to the drying load of the product because of the water added to maintain a flowable solution or slurry and to keep the pre-reactor at reasonable temperatures, but the system also entails additional capital investment for the pre-reactor over the granulating equipment, and requires relatively high product recycle ratios in order to form proper granules.

Alternatives have been proposed to the pre-reactor plus granulator system. For example, U.S. Patent 2,902,-342 to Kerley, issued September 1, 1959, discloses a method for making ammonium salts of a mineral acid by a two-step neutralization of an acid with ammonia, the second step being a tubular reactor; this method has the unfortunate disadvantage of producing a solid salt of no size uniformity, which thus requires further sizing for saleability. U.S. Patent 2,945,747 to Nielsson, issued July 19, 1960, discloses apparatus for granulating fertilizer in which the various liquid components are separately sparged into the granulation bed. Somewhat similar systems have been proposed from time to time, but these all suffer from a relatively low rate of capture of volatile components, which necessitates elaborate recovery and scrubbing apparatus. A similar apparatus in disclosed in U.S. 2,946,666 to Eymann, issued July 26, 1960; this apparatus also sparges the individual components into the granulation bed and, in addition to having the recognized disadvantages of a batch operation, also has the low capture rate problem.

It is an object of this invention to provide method and apparatus for producing granular fertilizer from a high proportion of liquid and gaseous feeds both simply and economically. It is another object of the invention to provide such method and apparatus wherein there is no requirement for the conventional pre-neutralizer or pre-reactor. Yet another object of the invention is to provide such method and apparatus exhibiting a high rate of capture of volatile components. Still another object of the invention is to provide such method and apparatus in which an acceptable quality granular product can be produced while using low recycle ratios in a continuous granulation. A further object of the invention is to provide method and apparatus capable of producing fertilizers of higher analysis than can be made in the conventional pre-reactor and ammoniator plant.

Figure 2:
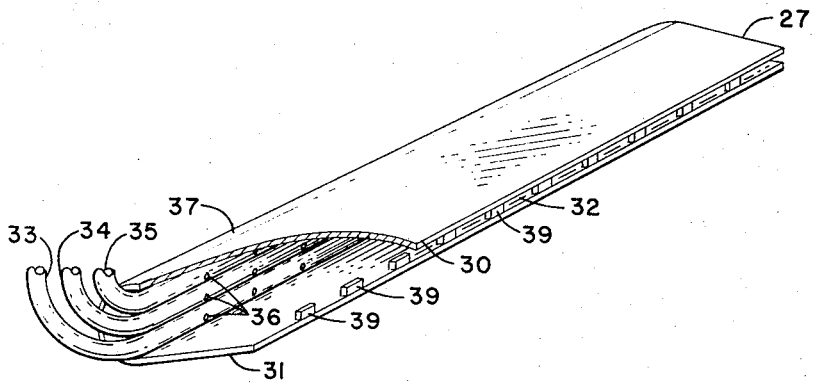
Figure 3:
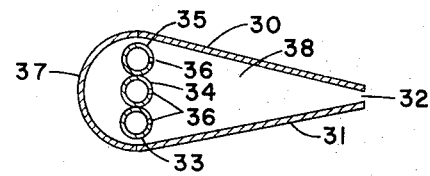
Figure 4:
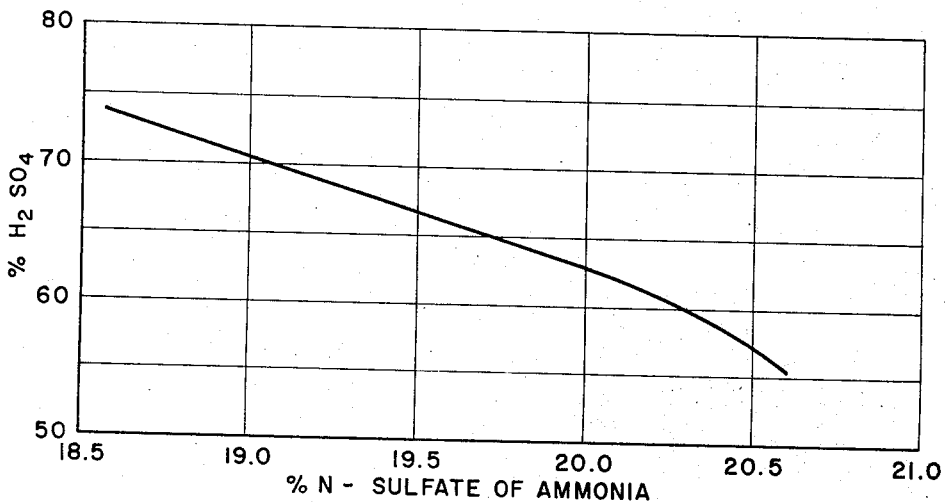

Other aspects, objects and the several advantages of this invention will become apparent to one skilled in the art upon study of this disclosure, the appended claims, and the drawing, in which:

FIGURE 1 is a vertical longitudinal section through one embodiment of the apparatus of this invention, FIGURE 2 is a perspective view of one reactor-distributor embodiment of the invention, FIGURE 3 is a transverse section through the embodiment of FIGURE 2, and FIGURE 4 is a graphical presentation of data obtained in the apparatus of this invention.

According to the invention, there is provided the method and apparatus for producing granular fertilizer from fluid raw material which comprises passing at least one acidic fluid fertilizer raw material to a distribution-reaction zone, passing at least one basic-reacting fluid fertilizer raw material to said distribution-reaction zone, effecting at least a partial neutralization reaction between said acidic and said basic-reacting raw materials within said distribution-reaction zone, maintaining said distribution-reaction zone submerged within a moving bed of granular solids, passing the product from said reaction to said moving bed, and recovering from said bed a granular fertilizer product. There is further provided, according to one embodiment of the invention, addition of solid raw material to the granulation. In another embodiment of the invention, provision is made for recycle to granulation feed of a portion of the granulated product.

Reference is now made to the drawings, and more especially to FIGURE 1, for a more detailed explanation of the invention. In the drawing, there is represented generally as 1 a typical cylindrical granulating drum which, as known in the art, is oriented essentially horizontally, sometimes with a slight downward slope from the inlet end (left side of the drawing) to the discharge end. The granulating drum comprises a cylindrical shell 2 supported on tires 3 and 4 by idler wheel assemblies 5 and 6. The drum is rotated via spur gear 7 by motor drive 8. The drum is further provided with annular end rings 9 and 10, which serve to maintain the desired bed depth. A product discharge hood is arranged at the discharge end of the drum, and comprises a suitable seal ring 11, a product discharge spout 12, an exhaust duct 13, and an induced-draft fan 14, which can discharge to a suitable vapor- and fines-recovery system, such as a water or acid scrubber, not shown. There can also be provided a solids feed system comprising a solids feed hopper 15, suitable solids metering means 16 such as a star valve, and a delivery spout 17. Liquids and/or gases, which can be diluted if desired by adding steam or water, are fed to the apparatus by a system comprising two or more storage vessels; three of these vessels are indicated here as items 18, 19 and 20. These vessels are connected by conduits 21, 22 and 23, respectively, through metering devices 24, 25 and 26 respectively, which can be individual metering valves or pumps or can be a single proportioning device such as a proportioning pump, to a reactor-distributor device 27. This device will be more fully explained in connection with FIGURES 2 and 3, and is supported in a suitable manner as by support 28 in a lower region of the drum so as to be immersed in the bed of fertilizer granules 29 during normal operation of the drum.

Refering now to FIGURES 2 and 3, the reactor-distributor device 27 comprises in a presently-preferred embodiment a pair of rectangular plates 30 and 31 which converge to define a narrow longitudinal slit 32. At the opposite extreme of plates 30 and 31 from slit 32 are provided a plurality of pipes. Two such pipes will suffice in certain instances, although three are shown here, namely items 33, 34 and 35. These pipes actually correspond to conduits 21, 22 and 23 of FIGURE 1, but are provided throughout the length of device 27 with perforations, slits or orifices 36. These orifices 36 are preferably so positioned on their various pipes to effect convergence of fluid streams issuing therefrom at some distance prior to reaching slit 32. Orifice sizes will depend, of course, upon the design throughput of the apparatus, and will also preferably vary in size along a given pipe so as to result in a relatively uniform discharge rate along the length of the pipe when taking into account pressure drop. It is also presently-preferred to provide splash baffles 39 in the slit directly opposite each set of holes 36 to prevent direct jetting of fluid into the bed. It should also be noted at this point that, although the figures show fluid being supplied to only one end of device 27, it is obvious that conduits 21–23 can be branched, preferably downstream of meters 24–26, and connected to both ends or to an intermediate portion of device 27. In such instance, sizes of orifices 36 will be changed accordingly. Device 37 is so constructed as to be fluid-tight except for exit slit 32, which requires closure caps on the longitudinal extremities, omitted here for clarity. Device 27 can also, if desired, be provided with a streamlining piece 37, although it is preferred that the space between piece 37 and pipes 33–35 not be in vapor communication with reaction zone 38, to facilitate clean-out of the device. If desired, device 27 can be chambered into sections along its length to allow ready changing of throughput rates.

In operation, a desired gaseous or liquid fertilizer raw material is charged to each of tanks 18–20 as appropriate. Meters 24–26 are adjusted to yield the desired product component ratio, and drum 1 is set into rotation by activation of drive 8. The fluid charges in tanks 18–20, referred to generally as A, B and C fluids, must be such that at least one is acidic in nature and another basic or alkaline in nature. The fluids react to produce a neutral or partilly neutralized liquid, as desired, in space 38, and the reaction product then issues through slit 32. If it is desired to include, as a constituent of the product, a component derived from one or more solid feedstocks, such material is introduced by way of hopper 15, meter 16 and spout 17, or can be slurried in a liquid feed if desired. Neutralization reactions are generally exothermic, and for this reason device 27 becomes quite warm, and aids in drying the granules. Although the drum can be pre-charged or seeded with solid inert or plant-food granules, this not essential to its operation when producing certain formulations. When exothermic heat of reaction is not sufficient to provide a product of the desired consistency, supplemental heat can be provided by either direct or indirect heat exchange, either axially or circumferentially of the drum, as is known in the art. For example, a direct-fired gas or oil burner axially of the drum is suitable, as is indirect steam tubing or jacketing on the outer surface of cylinder 2. Product granules removed by way of spout 12 can be further dried, screened, crushed and/or cooled as known in the art. Recycle, when desired, can comprise a fraction of the discharge of spout 12 or alternatively can, for example, be a fines product derived from screening spout 12 discharge. Recycle is effected by a conveyor to the inlet end of drum 1, as is known in the art. Product dust and small amounts of volatile vapors, such as ammonia, can be recovered by way of duct 13 and fan 14 in a suitable recovery system, such as a water or acid scrubber, not shown. Values from the scrubbing system can be recovered by simply returning them to a spray header in the interior of the drum, and spraying onto the bed surface, or alternatively can be first concentrated by, e.g., evaporation and then sprayed onto the bed surface or introduced by way of one of conduits 21–23.

It has been found that the present invention is highly suited for producing a granular product directly, or in one step, as it were, from all fluid feeds, such as gaseous or liquid anhydrous ammonia, aqua ammonia, products known in the art as nitrogen solutions which generally contain ammonia, urea, and/or nitric acid in varying proportions, oleum, sulfuric acid, nitric acid, phosphoric acid, solutions of urea and of potassium hydroxide. Although the present invention is well adapted for using feeds which are exclusively liquid and/or gaseous, solid feed material can also be used. Included in suitable solid feeds are potassium chloride, potassium nitrate and various phosphate salts, as well as inerts for filler purposes, such as expanded vermiculite, clays and silica.

The invention has been illustrated in conjunction with a drum granulator, but the novel reactor-distributor of this invention can also be adapted to other known granulating devices. For example, the reactor-distributor can be located radially on a tilted disc or pan granulator, or within the bed of a fluidized bed granulator or double shaft pug mill granulator.

The invention will be further illustrated by reference to the following specific examples:

EXAMPLE I

An apparatus similar to that illustrated in the figures was used to produce granular ammonium sulfate. The drum was about 2½ feet in diameter by 3 feet long, and the normal bed depth was about 6 inches. Drum speed was varied between about 10 and about 20 r.p.m.'s. A typical reactor-distributor used in this and the following examples was about 2 feet long and had a cross-sectional area, perpendicular to its longitudinal axis, of about 2¼ square inches. Each of the pipes 33–35 was provided with 10 orifice holes, ranging in diameter from 1/32 to 1/8 inch. Anhydrous ammonia at a rate of about 77.7 lb./hr. and 47° Bé. sulfuric acid at a rate of about 393 lb./hr. were fed to the reactor-distributor, to produce about 470 lbs./hr. of ammonium sulfate granules at a recycle rate of about 1,080/hr.; this is a recycle ratio of about 2.3:1. Sulfuric acid concentrations were varied between about 55 and 100 percent, and highly satisfactory product granules were produced throughout the range, although fumes at the high end of the acid concentration indicated the desirability of an ammonia scrubber in that portion of the range. It was found that the nitrogen content of the product varied with acid concentration, as illustrated in FIGURE 4.

EXAMPLE II

The equipment of Example I was used to produce ammonium phosphate from anhydrous ammonia, phosphoric acid ranging in acid concentration from 50 to 85 percent, and sulfuric acid ranging in acid concentration from 60 to 100 percent. The product granules had analyses ranging from 15.20 to 15.50 percent nitrogen and 48.16 to 49.18 percent $P_2O_5$. Recycle ratio was maintained at about 3.5:1, with a net production rate of about 500 to about 600 lbs./hr.

EXAMPLE III

The equipment of Example I was used to manufacture a 24-8-4 fertilizer. Feed materials were anhydrous ammonia, 67.2 percent nitric acid, 71.6 percent phosphoric acid, 78.0 percent sulfuric acid, and particulate solid muriate of potash. Actual analysis of the product granules was 24.64 percent nitrogen, 8.79 percent $P_2O_5$, and 5.13 percent $K_2O$. Recycle ratio was maintained at about 5.3:1 at a net production rate of about 400 lbs./hr.

EXAMPLE IV

The apparatus of Example I was used to manufacture an 18-18-18 fertilizer using as raw materials a urea-ammonia solution of 45.5 percent nitrogen (30.5 percent ammonia, 43.3 percent urea), 71.6 percent phosphoric acid, 78.0 percent sulfuric acid, and particulate solid muriate of potash. Actual product analysis of the granules was 17.84 percent nitrogen, 19.74 percent $P_2O_5$, and 19.01 percent $K_2O$. Recycle ratio was about 4.7:1 for a net production rate of about 300 lbs./hr.

Many other fertilizer products of differing plant food ratios have been produced in this apparatus. The preceding examples serve to illustrate the flexibility of this invention, in that exclusively fluid feeds were used in Examples I and II, while a combination of liquid and solid feedstocks was used in Examples III and IV. It has been noted, during operation according to the preceding examples and many other runs, that the present invention enables production without a system for recovery of ammonia or other volatiles when the granulation bed temperature is kept within certain limits. For instance, where the most volatile ingredient in a formulation is ammonia, the bed at the granulator exit is preferably in the temperature range of about 180 to 250° F., more preferably about 200 to 225° F. When formulating with a nitrate solution, the preferred range is about 160 to 230° F., more preferably about 190 to 220° F. Other formulations will similarly exhibit ranges, using my invention, where the vapor recovery system is not required. My invention has also been operated to produce a urea-formaldehyde condensation product in situ in the bed; this can be effected by introducing urea and formaldehyde separately into the reactor 27 and also introducing acidic material, as catalyst, into the mixture. One of the three components, urea, formaldehyde, and catalyst, is preferably added to the other two just prior to issuance of the mixture from the reactor 27, and this can be effected by an addition sparge pipe located outside the main reactor 27 and midway between the slit 32 and the pipe 33. An additional plate similar to plate 31 converges to adjacent slit 32, so that there are, in effect, a reaction zone 38 and a supplemental feed zone discharging adjacent slit 32. Residual alkalinity in the bed serves to stop the condensation reaction after water-insoluble nitrogen is formed in the bed, but before it has proceeded to an excessive molecular weight material. It can be seen that there are provided method and apparatus whereby the conventional pre-reactor or pre-neutralizer for liquid feeds, along with its attendant expensive scrubbing system, recirculation piping, valves, agitation, etc., is not necessary. Recycle ratios lower than normally used suffice by this invention to produce a satisfactory granular product, i.e., satisfactory product can be produced with recycle ratios below about 6:1, for example down to about 1:1 or even less, although the invention contemplates use of recycle ratios higher than 6:1 if desired. Among the less obvious advantages accruing from use of this invention are: higher analysis products can be made in the conventional granulating drum by use of more concentrated feeds, trace elements can be homogeneously incorporated in their more economical solution form, the process is highly flexible by virtue of being able to readily utilize feeds in gaseous, liquid and solid form, the process can readily produce low analysis grade fertilizers by feeding inert fillers, and storage space at existing installations formerly required for solid raw materials is made available for finished product storage.

While particular embodiments of the invention have been described, it will be understood, of course, that the invention is not limited thereto, since many modifications may be made; and it is therefore contemplated to cover by the appended claims any such modifications as fall within the true spirit and scope of the invention.

The invention having thus been described, what is claimed and desired to be secured by Letters Patent is:

1. Apparatus for producing solid granular fertilizer comprising, in combination, a generally horizontal cylindrical granulating drum, means to rotate said drum about its cylindrical axis, elongated reactor-distributor means of a length substantially greater than one-half of that of said drum arranged in said drum with the longitudinal axis thereof substantially parallel to the cylindrical axis of said drum and located in a lower region of said drum, said reactor-distributor means comprising a chamber having a plurality of fluid inlet means along a substantial portion of the length thereof, fluid exit means directly opposed to said fluid inlet means, means for supplying a basic-reacting fluid to some of said plurality of fluid inlet means, means for supplying an acidic liquid to others of said plurality of fluid inlet means, means for maintaining a bed of particulate solids within said drum, and means for removing particulate solids from said drum.

2. Reactor apparatus comprising an elongated reaction chamber, means for suspending said reaction chamber within a moving bed of particulate fertilizer material, said reaction chamber being of a length substantially greater than one-half of that of said bed, a plurality of fluid inlet means along a substantial portion of the length of said chamber, fluid exit means opposite said fluid inlet means, means for supplying acidic fluid fertilizer raw material to some of said plurality of fluid inlet means, along the length of said chamber and means for supplying alkaline fluid fertilizer raw material to others of said plurality of fluid inlet means along the length of said chamber.

References Cited

UNITED STATES PATENTS 2,965,471  12/1960  Stassfort _____ 71—64 X
3,005,696  10/1961  Hignett et al. _____ 71—64

DONALL H. SYLVESTER, *Primary Examiner.*

T. D. KILEY, *Assistant Examiner.*